(12) United States Patent
Khawaja et al.

(10) Patent No.: US 12,483,659 B2
(45) Date of Patent: Nov. 25, 2025

(54) TRACKING IN-SERVICE IP PHONES USING MACHINE LEARNING

(71) Applicant: SAUDI ARABIAN OIL COMPANY, Dhahran (SA)

(72) Inventors: Kashif Khawaja, Dhahran (SA); Irslan Siddiq, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 298 days.

(21) Appl. No.: 18/472,305

(22) Filed: Sep. 22, 2023

(65) Prior Publication Data

US 2025/0106324 A1    Mar. 27, 2025

(51) Int. Cl.
*H04M 7/00*    (2006.01)

(52) U.S. Cl.
CPC ................ *H04M 7/0084* (2013.01)

(58) Field of Classification Search
CPC ................................................ H04M 7/0084
See application file for complete search history.

(56) References Cited

U.S. PATENT DOCUMENTS

| | | |
|---|---|---|
| 7,508,754 B1 | 3/2009 | Sankaranarayanan et al. |
| 8,547,967 B2 | 10/2013 | Grabelsky et al. |
| 12,301,768 B2 * | 5/2025 | Gong ................ H04W 8/20 |
| 2009/0141707 A1 * | 6/2009 | Kavanaugh ........ H04L 63/0823 370/352 |
| 2010/0034194 A1 | 2/2010 | Fieremans et al. |
| 2020/0112487 A1 * | 4/2020 | Inamdar ................ H04L 67/14 |
| 2021/0406255 A1 * | 12/2021 | Raghuramu .......... G06F 16/245 |
| 2022/0013222 A1 * | 1/2022 | Marotta ............. G01R 19/1659 |
| 2022/0215948 A1 * | 7/2022 | Bardot .................. G16H 40/40 |
| 2023/0319189 A1 * | 10/2023 | Gong .................. H04M 7/0075 370/259 |

FOREIGN PATENT DOCUMENTS

EP            4068863 A1 * 10/2022    ............ H04W 48/18

* cited by examiner

*Primary Examiner* — Jay P Patel
(74) *Attorney, Agent, or Firm* — Leason Ellis LLP (57) ABSTRACT

A method of determining whether an end user device coupled to a voice over Internet Protocol (VOIP) network is online or offline assembling source data from a variety of network monitoring devices and services including at least one selected from the group consisting of: of asset inventories, VoIP Call Control Servers, routers, firewalls, and intrusion protection systems (IPSs) concerning an online and offline status of a plurality of end user device in the network. The method also comprises training a machine learning algorithm using the source data to determine whether the end user devices coupled to the VoIP network are online or offline, and after training, executing the machine learning algorithm to determine whether a specific end user device currently coupled to the VoIP network is online or offline.

12 Claims, 5 Drawing Sheets

TRACKING IN-SERVICE IP PHONES USING MACHINE LEARNING

FIELD OF THE DISCLOSURE

The present disclosure is related to IP telephony, and more specifically is related to a system and method of tracking in-service IP phones using machine learning.

BACKGROUND OF THE DISCLOSURE

Voice over Internet Protocol networks typically have a plurality of user end points that constitute IP phones or VoIP-enabled computers. The end points can be distributed widely over the network with numerous intermediary devices. One problem associated with VoIP networks, and in particular with monitoring such networks, is that it has proven difficult to determine whether the disappearance of a group of phones being monitored constitutes an outage, i.e., whether the end points are really off the network or whether connectivity to their management system has been lost, and the end points are otherwise online and in-service. This problem becomes especially acute when the VoIP network is diverse in terms of geography, segmentation, footprint, monitoring, and administrative control. The problem is also exacerbated when the end point devices come from different manufacturers, when the end points are not inventoried properly in an organized software/system, and also when different VoIP technologies are employed (e.g., IMS vs Cisco Call Manager, and other SIP based Call Control planes).

Current IP phone management systems use a static approach to determine the service state of IP phones. In other words, these solutions use methods and protocols such as ICMP (pings), SNMP polls, or TR-069 which cannot be relied upon for high degree of certainty. These systems and methods are limited in the resources that they utilize in the network and on the user-endpoints (phones) as well as on the management systems. In addition, the information provided by such systems is usually reviewed by a human analyst. These characteristics are disadvantageous for large networks which are highly sensitive to disruption in telephony services.

Given the challenges and limitations of the current systems, what is needed is a robust system for predicting and prioritizing the state of the IP phones in a network including information as to whether the phones are offline, unregistered and out-of-service or online, unregistered and out-of service.

SUMMARY OF THE DISCLOSURE

According to a first aspect, the present disclosure describes a method of determining whether an end user device coupled to a voice over Internet Protocol (VOIP) network is online or offline. The method comprises assembling source data from a variety of network monitoring devices and services including at least one selected from the group consisting of: of asset inventories, VOIP Call Control Servers, routers, firewalls, and intrusion protection systems (IPSs) concerning an online and offline status of a plurality of end user device in the network. The method also comprises training a machine learning algorithm using the source data to determine whether the end user devices coupled to the VoIP network are online or offline, and after training, executing the machine learning algorithm to determine whether a specific end user device currently coupled to the VoIP network is online or offline.

According to another aspect, the present disclosure describes a method of diagnosing a potential outage in a voice over Internet Protocol (VOIP) network. The method comprises assembling source data from a variety of network monitoring devices and services including at least one selected from the group consisting of: of asset inventories, VOIP Call Control Servers, routers, firewalls, and intrusion protection systems (IPSs) concerning an online and offline status of a plurality of end user devices in the network. The method also comprises training a first machine learning algorithm using the source data to determine whether the end user devices coupled to the VoIP network are online or offline, training a second machine learning algorithm using the source data to diagnose outages in the VoIP network based on patterns of online or offline end user devices in the VoIP network, monitoring a plurality of end user devices currently coupled to the VoIP network, detecting a potential outage among the end user devices in the VoIP network, and executing the first trained machine learning algorithm to determine whether end user devices perceived to be offline are likely actually offline due to an outage, and executing the second machine learning algorithm to determine diagnostic features of the outage, when end users devices are determined to be actually offline, including whether the outage is confined to one or more of a specific location, a building, a geographic area, or a subnet.

DETAILED DESCRIPTION OF CERTAIN EMBODIMENTS OF THE DISCLOSURE

The present disclose describes a method of determining whether end user devices in a Voice-over-Internet-Telephony (VOIP) are online or offline using a machine learning methodology. A machine learning algorithm is trained using information collected from a range of sources including IP phones, telephony management systems, IP routers, LAN switches, Intrusion Protection Systems, firewalls, network routers, asset discovery scans, power units supplying electricity to facilities, etc. This information includes a number of indicia that can be used to identify the state of an end user device such as IP addresses, MAC addresses, phone numbers, and serial numbers, among others. Data elements can be extracted from this data set and vectorized for training the machine learning algorithm.

Figure 1:
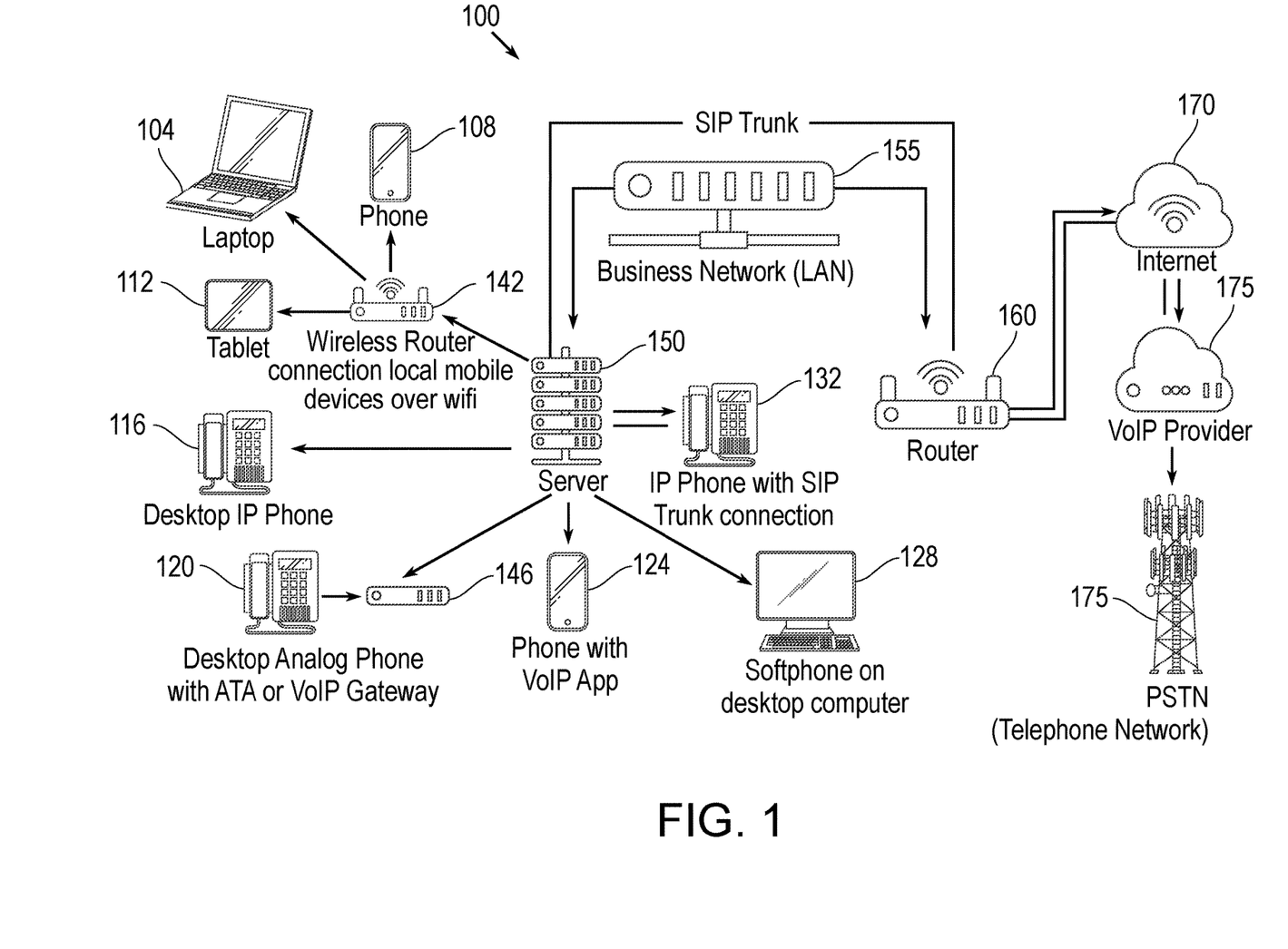
FIG. 1 is a schematic, simplified illustration of an exemplary VoIP network.

FIG. 1 is a schematic, simplified illustration of an exemplary VoIP network. The VoIP network 100 includes a number of instances of end user devices through which end users conduct voice communications over the network. The types of user devices, which are positioned at the "customer edge" of the network, typically include a laptop computing device 104, a mobile phone device 108, a tablet computing device 112, a desktop IP phone device 116, a desktop analog phone device with an IP telephony gateway 120, another mobile phone device 124, a desktop computer running an IP softphone application 128, and another desktop IP phone device 132, by way of example and not limitation of the types of devices and number of devices in a given VoIP network. End user devices 104, 108 and 112 are communicatively coupled to a wireless router 142 via a wireless protocol such as the 802.11 family of protocols. In turn, wireless router 142 is communicatively coupled to IP server 150. End user device 120 is coupled to the IP server 150 via a VoIP gateway 146 whereas end user devices 116, 124, 128 and 132 are communicatively coupled directly to IP server 150 without an intermediary device in between the end user devices and the server.

IP server 150 is coupled to business local area network (LAN) hub 155. IP server 150 is also directly coupled to a main Internet router 160 via a Session Initiation Protocol (SIP) trunk line. Session Initiation Protocol is a signaling protocol that enables the Voice Over Internet Protocol (VOIP) by defining the messages sent between endpoints and managing the actual elements of a call. The LAN hub 155 is also coupled to the main Internet router 160. Internet router is coupled, on the upstream side, to the Internet via Internet provider 170. In turn, Internet provider 170 is communicatively coupled to a VoIP provider 175 such as Nextiva™, Vonage™ or Zoom™, which are merely illustrative of known VOIP providers with which the Internet Provider 175 can communicate. The VoIP provider can connect and complete calls to the Public Switched Telephone Network (PSTN) 180. Through VoIP network 100, end users experience a seamless voice telephone call experience through Internet Protocol in much the same manner as if the call were processed in a conventional manner through the PSTN. Moreover, as can be discerned, VoIP network traffic can flow through a number of intermediary devices between source and destination devices at the customer edges of the network.

In addition to the devices of the VoIP network shown FIG. 1, there are a number of stand-alone devices or configured computing devices that perform monitoring and protection function on the network including firewalls, scanners, and Intrusion Protection Systems (IPSs). The devices and/or systems record information regarding network traffic and intrusions. Data from various data sources is required to obtain a complete view of the footprint of IP phones in the VoIP network. When any end user device comes online or goes offline, this event leaves fingerprints on the network. This information can be obtained from logs of network devices like routers, firewalls and IPSs. Additionally, IP phone management systems also store a wealth of information about the status of IP phones in the network. The information from these sources can be used to assess the state of an end user device.

Figure 2:
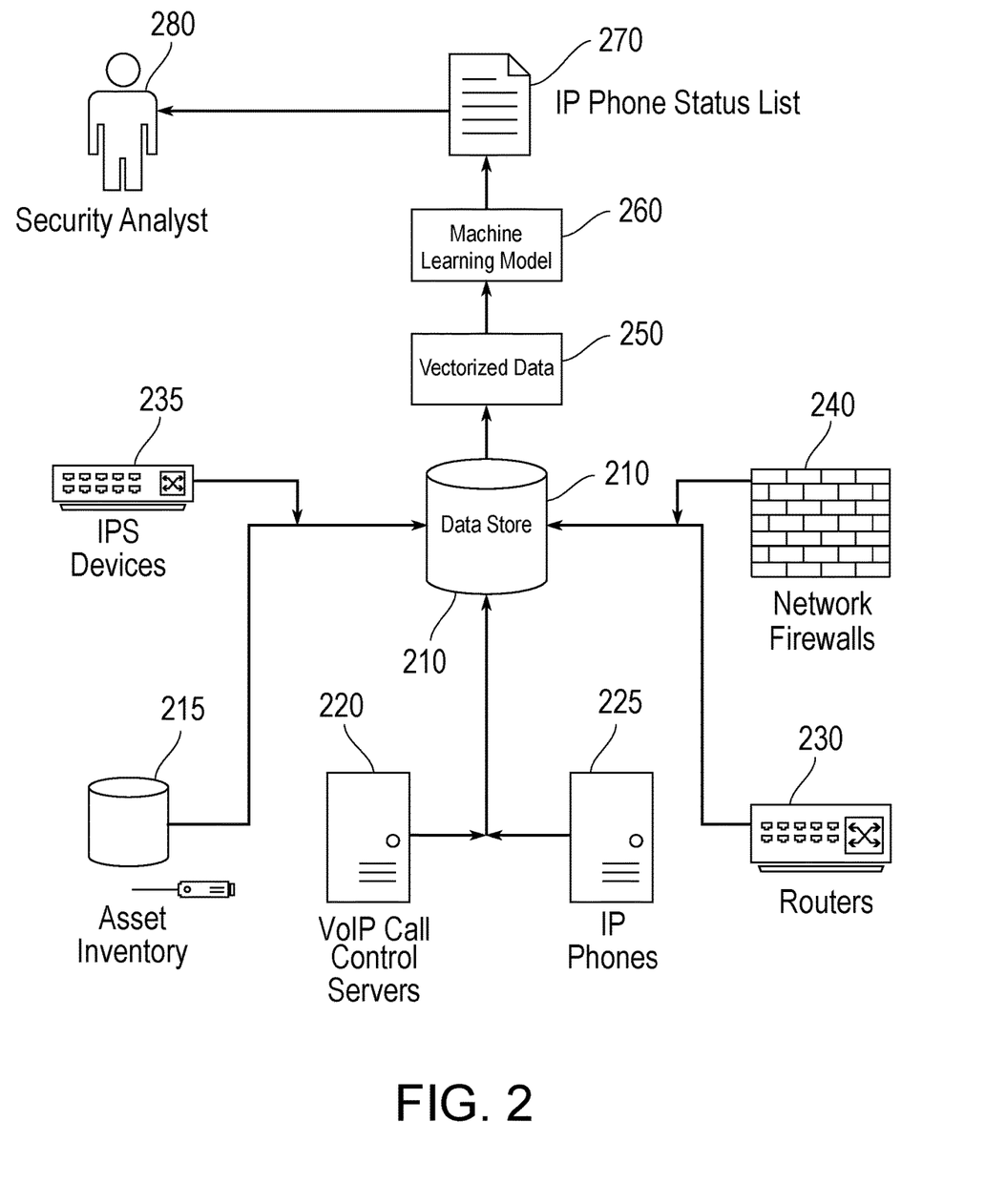
FIG. 2 is a schematic illustration of high-level data collection of data used to train a machine learning model to perform a method of classifying the online/offline status of an end user device in a VoIP network according to an embodiment the present disclosure.

FIG. 2 is a schematic illustration of high-level data collection of data used to train a machine learning model to perform a method of classifying the online/offline status of an end user device in a VoIP network according to an embodiment the present disclosure. In the figure, a data store 210 used to store training data is shown coupled to several data sources controlled by phone management systems including an asset inventory database 215, VOIP Call Control Servers 220 and IP Phones 225. The training data store 210 is further coupled to devices in the network including routers 230, IPSs 235 and firewalls 240. Data that is received and stored by the training data store 210 is delivered to one or more computing devices 250 that vectorize the data. The vectorized data is then used as input to a machine learning model 260 that is configured to classify the status of an end user device in the VoIP network as either online or offline. When the machine learning model 260 is executed over a range of end users in the network (i.e., iteratively), a list of relevant/interesting IP Phone Statuses 270 can be compiled from the output of the machine learning model. A security analyst 280 can use the list of relevant/interesting IP Phone Statuses 270 to improve network monitoring and/or to initiate remediation actions.

The data store 210 is designed to intake large amounts of unstructured data. The information collected by the data store 210 from the various sources 215, 220, 225, 230, 235, 240 includes data that identifies end user devices in the network. For example, end user devices can be identified by one or more of: IP addresses, MAC addresses, phone numbers, serial numbers, etc. This data forms the basis of a training data set which comprises both online and offline end user devices at any given time. A computing device is configured to extract specific features of the data during vectorization. The vectorized data is used as the input data for the machine learning model. After training of the model, new data concerning a live VoIP network to which a particular end user device is coupled is used to classify the particular end user device as either online or offline.

TABLES I and II below are examples of vectorized feature data pertaining to a particular end user device that is extracted from the raw data compiled by the data store 210. The features include basic user device identification data such as the IP (Internet Protocol) and MAC (Media Access Control) addresses of the device, a phone number, the hardware type and model of the device, and installed software model. Other features are more specific to the network status of the device including current online/offline status, a time stamp of the last monitored status, SIP (Session Initiation Protocol) registration status and time, LAN switch hostname and port, as well as a username of the device.

TABLE I

| IP address | MAC address | Phone # | Hardware | Model | Software | Network Status | TimeStamp |
| --- | --- | --- | --- | --- | --- | --- | --- |
| 1.1.1.1 | 00:11:22:aa:bb:cc | 122233 | IP Phone 2300 | ABC | 1.2.3.4 | Offline | 1/2/2023 20:01 |
| 2.2.2.2 | 33:44:55:aa:bb:cc | 156897 | IP Phone 2301 | CDE | 3.2.1 | Online | 1/7/2023 20:01 |
| 3.3.3.3 | 12:77:aa:bb:cc | 1235966 | IP Phone 3301 | ABC | 2.5 | Online | 2/2/2023 20:01 |
| 4.4.4.4 | 00:11:22:aa:bb:cc | 894678 | IP Phone 4301 | QWE | 8.4 | Offline | 4/3/2023 20:01 |

TABLE II

| IP address | MAC address | SIP Registration State | SIP Registration Time | LAN Switch Hostname | LAN Switch Port | Username |
|---|---|---|---|---|---|---|
| 1.1.1.1 | 00:11:22:aa:bb:cc | Registered | 11/2/2022 18:01 | CTY-BLDG-FLR-1 | 56 | phoneuser |
| 2.2.2.2 | 33:44:55:aa:bb:cc | Unregistered | 5/7/2022 14:05 | CTY-BLDG-FLR-2 | 24 | phoneuser |
| 3.3.3.3 | 12:77:aa:bb:cc | Registered | 1/16/2023 2:03 | CTY-BLDG-FLR-1 | 78 | phoneuser |
| 4.4.4.4 | 00:11:22:aa:bb:cc | Registered | 2/27/2023 5:03 | CTY-BLDG-FLR-2 | 5 | phoneuser |

Figure 3:
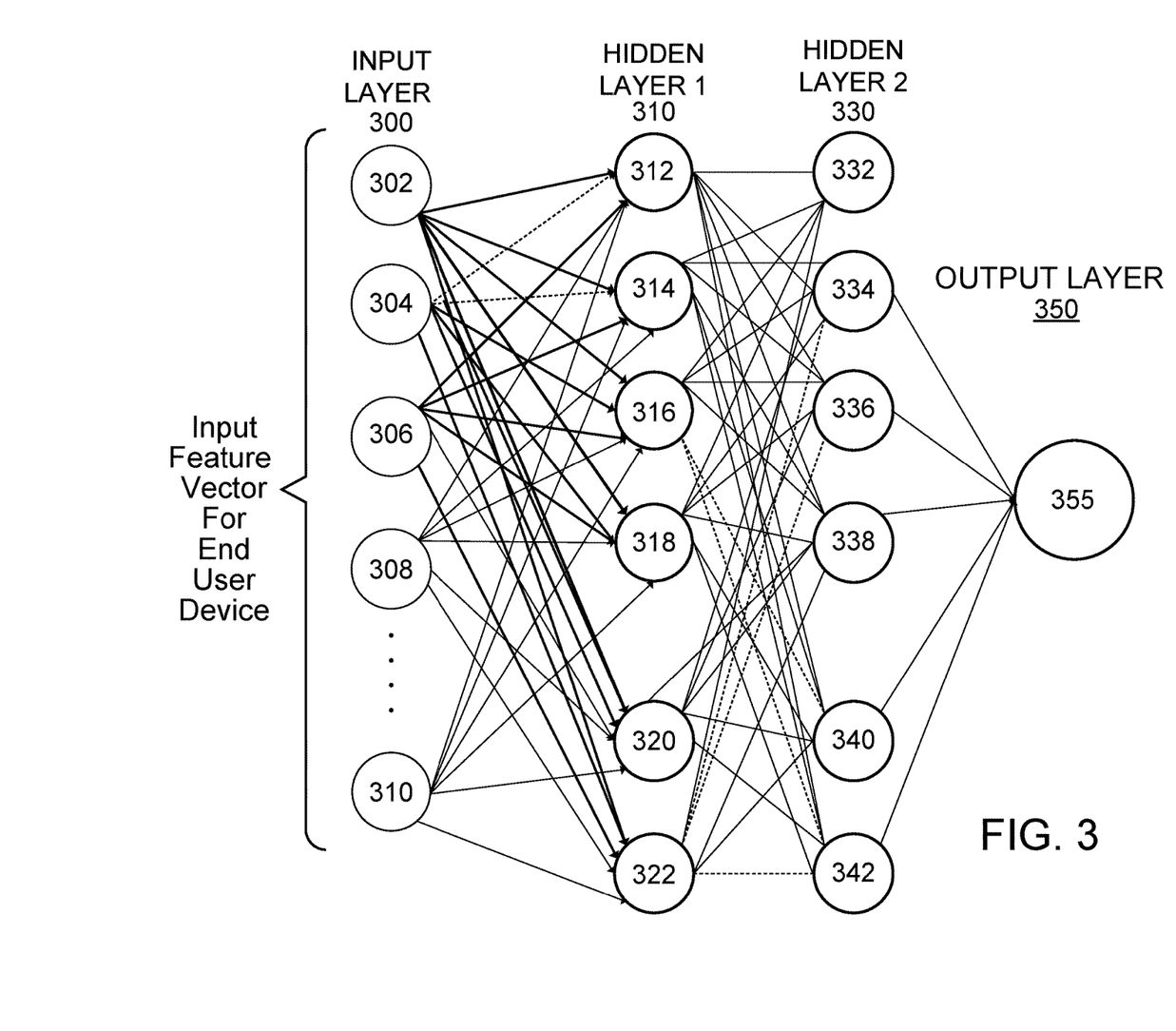
FIG. 3 is a schematic diagram of an example neural network/deep learning model that can be used in the context of the present disclosure for classifying the online status of a specific end user device.

As noted, the features are vectorized for input to a machine learning model. FIG. 3 shows a schematic diagram of an example neural network/deep learning model that can be used in the context of the present disclosure for classifying the online status of a specific end user device. The machine learning model can be based on any suitable technique known in the art, including but not limited to artificial neural networks (e.g., deep learning networks, convolutional neural networks (CNNs), recurrent neural networks (RNNs), reinforcement learning networks (RLNs), support vector machines (SVMs), k-means and Naïve Bayes algorithms, as well as boosting algorithms such as Adam. Preferably, the machine learning model is a supervised machine learning algorithm but non-supervised ML algorithms can be used as well in combination with a supervised ML algorithm.

Referring again to FIG. 3, the exemplary machine learning model is a neural network contain four layers: an input layer 300, a first hidden layer 310, a second hidden layer 330 and an output layer 350. While only two hidden layers are shown, this is merely for case of illustration, and the neural network can contain a larger number of hidden layers, or a smaller number (i.e., a single hidden layer). The input layer includes nodes which receive a row of vectorized feature data. That is, node 302 receives data corresponding to vectorized feature 1, node 304 receives data corresponding vectorized feature 2, and so on, through to node 310, characterized as vectorized feature N because an arbitrary number of vectorized features can be included in any given implementation in accordance with this disclosure. As such, it should be clear from the illustration that, while 5 input nodes are shown, a much larger number N are used in practice to account for the large number of features of the input data.

The input data layer 300 feeds into the first hidden layer 310 in which the inputs are acted upon using weights and an activation function. The weights given to the various inputs are learned during a training phase. In a supervised machine learning model, the weights are learned by matching known outputs to the input data using forward and backward propagation. The first hidden layer contains six nodes 312, 314, 316, 318, 320, 322. Each of the nodes of the hidden layer is coupled to each of the nodes of the input layers, making a total of N (number of nodes of input layer)×N+1 (number of nodes of hidden layer) combinations in total. The output of each of the first hidden layer 310 is a sum of the activations of each node 312-322 based on the input data these nodes receive. The output of the first hidden layer is fed to a second hidden layer 330, which similarly contains nodes 332, 334, 336, 338, 340, 342. More specifically, the output of each node of the first hidden layer 312-322 is fed to each node of the second hidden layer 332-342. In this manner, a second order of activation occurs, in which a function and weights are applied to the output of the first hidden layer. The large number of combinations in which interactions can occur among the different feature variables (such as a MAC address or LAN port), in combination with the speed of training using a large data set, make this modeling framework a potent way to compare which variables have more or less impact on the final output. The output of the second hidden layer 330 is fed to an output layer 350, which in this case contains a single node 355. Node 355 contains a binary output which can be in the form of 1/0, yes/no, or online/offline, and indicates whether the end user device is online or offline.

The ML algorithm described thus far determines the status of a particular end user device based on information that concerns the particular user device. There are many instances however, when it is useful to determine the status multiple devices to determine the status of sections of a network, e.g., to determine a location outage. Another ML algorithm can be used for this purpose, and, in this scenario, the ML algorithm is trained using collective data concerning multiple end user devices.

Figure 4:
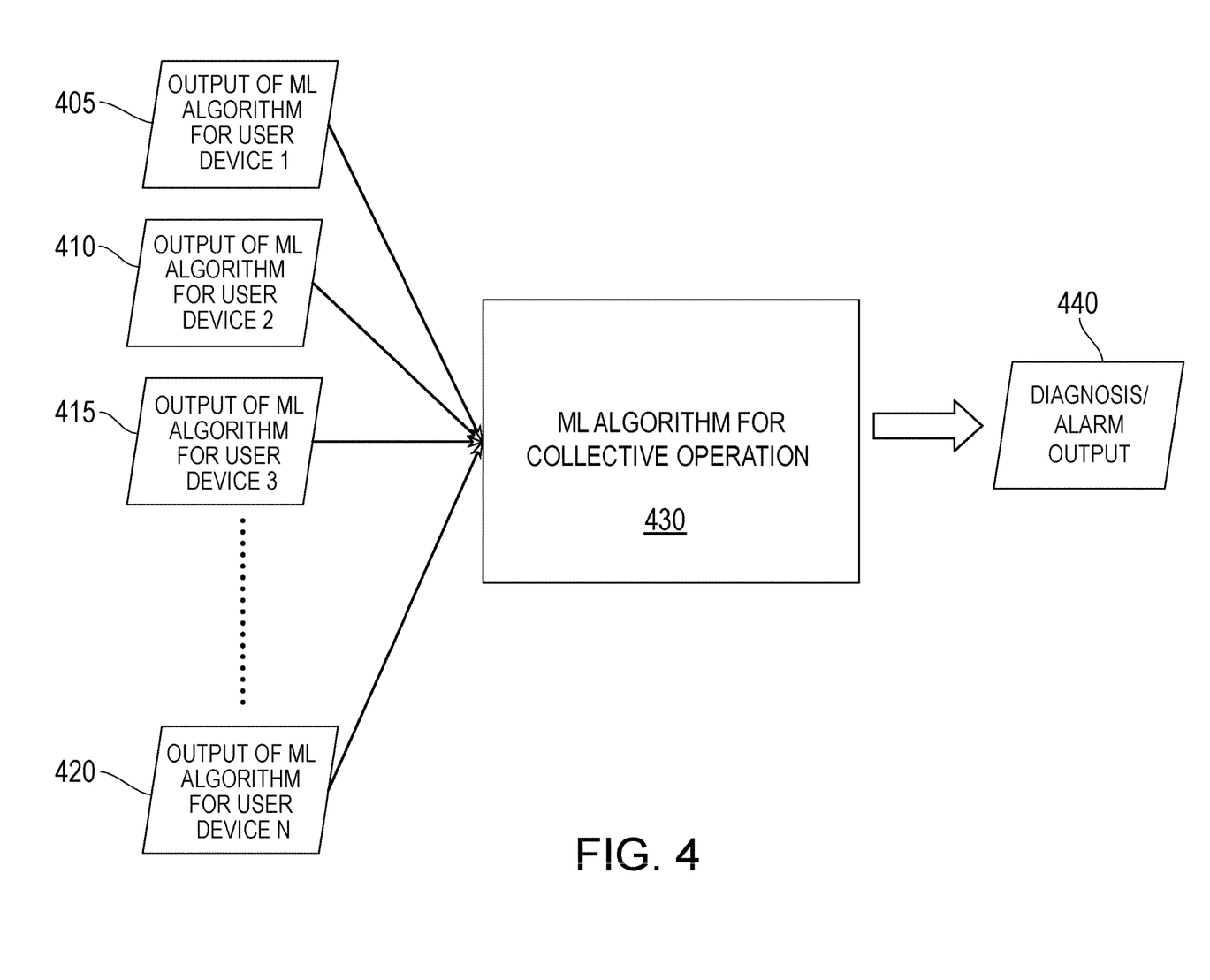
FIG. 4 is a schematic illustration of using an algorithm to diagnose the status of a network in this manner according to an exemplary embodiment of the present disclosure.

FIG. 4 is a schematic illustration of using an algorithm to diagnose the status of a network in this manner according to an exemplary embodiment of the present disclosure. For each of a plurality of end user devices, an individual machine learning algorithm, as discussed above, is executed to determine the online/offline status of the respective end user devices. The outputs of these executed ML algorithms corresponding to a first end user device 405, a second end user device 410, a third end user device 415, and an nth end user device 420, are input to the collective ML algorithm 430. The output 440 of the ML algorithm is used to diagnose relevant sections of a network in which end user devices 1, 2, 3 . . . n, are located. The output 440 can also be used to trigger alarms or remedial action if it is determined, for example, that an unscheduled outage of a large number of end user devices has occurred.

The following scenarios illustrate ways in which the machine learning model can utilize available network data to determine whether an end user device is in service.

1. End User Device Unreachable

In a first scenario an IP Telephony management system reports an end user device, such as an IP phone, as unreachable. The management system could be using Internet Control Message Protocol (ICMP) pings or Simple Network Message Protocol (SNMP) messages to communicate with the IP phone in order to check its health and status. The fact that the IP phone appears to be unreachable via the messages does not necessarily mean that the phone is "out-of-service." Other network data can be leveraged by the machine learning model to determine the actual status. For example, every VOIP user-endpoint (UE) in a network needs to register with a registrar. The registrar stores data regarding the current state of that UE in its database. Additionally, a LAN switch on which a UE resides typically records the state of the Ethernet port to which the UE is connected. The Ethernet port state can be acquired actively using SNMP or alternatively can be deduced using syslogs which are messages that can be configured to be generated when a port goes up or down.

Furthermore, the LAN switch typically stores logs describing other events including hardware failure, software failure and power module failure or disruption. Any network router that the IP phone connects through typically also stores logs giving indications of problems, issues or changes occurring on it around the same time as the LAN switch. Many organizations also employ change management systems which track maintenance activities that are scheduled to take place in the network. All of these sources of information can be used by the machine learning algorithm to predict with a very high degree of certainty whether the IP phone has actually disconnected from the network or the VOIP registrar or is it actually working normally.

2. Outage Scale

There are cases in which some number of end user devices are reported to be offline by an IP Phone management system or even a local monitoring system. The methodology described above in reference to FIG. 4 can help ascertain whether the phones are truly out-of-service. If they are, then a machine learning algorithm can provide further useful diagnostic information regarding the outage such as whether: (1) the outage is confined to a certain specific location, a specific building, a geographic area, or a subnet homed to one of the multiple VOIP registrars serving the whole network; (2) the outage is due to a power related issue at a specific site where all these phones reside; and (3) whether the outage is due to a power related issue or malfunction of a particular router in the path which is used by the end user devices of the VoIP network to communicate with the registrar or with the rest of the network. There are a number of different diagnostic outcomes, and the more organized information available to the ML algorithm the more accurate is the diagnosis of the purported outage of the end user devices.

Predictable (Scheduled) Vs. Unscheduled Behavior

Even when some data sources are not available, with sufficient training data, the machine learning algorithm can over time predict what the disappearance of a number of end user devices is related to (e.g., scheduled maintenance activity, normal user behavior or chronic issues with the supporting infrastructure). For example, if twenty-five end user-device phones go out of service at 12:30 AM on a particular day the algorithm will be able to correlate whether this outage is related to a scheduled maintenance activity (SW patches, etc.) which typically occurs at this time, in this area of the network, etc. As this occurrence is typically followed by the end user devices recovering within a short period, the ML algorithm will be able to determine that these phones always recover by 1:00 AM, the output of the algorithm is configured to avoid triggering an alarm. In addition, the ML algorithm can use logs from end user devices in the same geographic area or subnet or routers to diagnose whether a general service disruptive event (fiber cut, power outage, network routers failure, etc.) has taken place.

Identifying Problem and Root Cause

The ML algorithm (as shown in FIG. 4) can go beyond simply identifying an actual outage or unscheduled network behavior, but also can be used to identify any causes of such network failures. A VOIP phone can be out-of-service if it loses connectivity to the network caused by power failure or network cabling issues at the user end. An outage can also occur due to a variety of other reasons: network router issues/failures, fiber cuts, call processing system core servers issues, etc. By collecting data from all sources including logs and live state-cache captures from various devices, a fingerprint regarding the failure point can be ascertained, as well as ways to rectify the failure.

Figure 5:
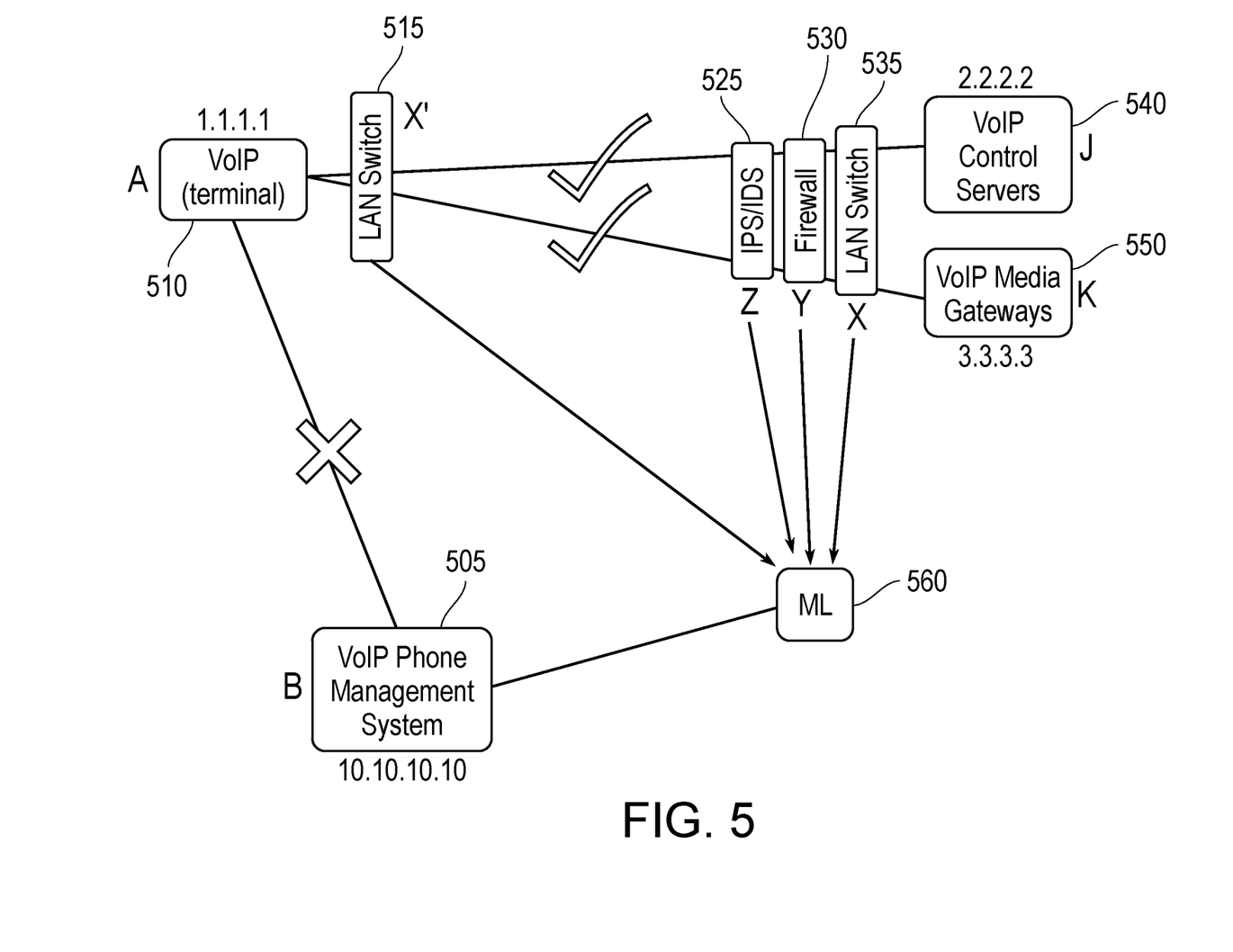
FIG. 5 illustrates an example failure in addition to sources of information regarding the failure in a VoIP network according to an embodiment of the present disclosure.

FIG. 5 illustrates an example failure in addition to sources of information regarding the failure in a VoIP network according to an embodiment of the present disclosure. In the figure, a VOIP phone management system 505 that monitors the network indicates that the VOIP Phone 510 is out of service via a break ("X") in the connection. Within the network, the VOIP phone 510 is connected to VoIP call control server 540 and VoIP media gateway 550 through several intermediary network components. The intermediary components include a first LAN switch 515 on the user side (positioned proximate to the VOIP phone in the network) and an Intrusion Protection System 525, a firewall 530 and second LAN switch 535 on the network side (positioned relatively proximate to the VOIP call control server 540 and VoIP media gateway 550). In the exemplary illustration of FIG. 5, IP phone 510 corresponds to network subnet 1.1.1.1, VOIP call control server 540 corresponds to network subnet 2.2.2.2, and VoIP media gateway 550 corresponds to network subnet 3.3.3.3.

A computing device 560 executing a machine learning algorithm as described above is connected to the network and is able to access information from the components therein. In the illustrated example, information from the first LAN switch 515 includes system logs (syslogs) that show that the port connected to A came up at the last reboot of LAN switch 515 and there are no syslog messages indicating that it ever went down. Further an active periodic SNMP poll (every 1 min for example) of LAN switch 515 shows that the state of the end user device port on the LAN switch 5151 is up and operational. Similarly, syslogs indicate that an UPLINK port on LAN switch 515 that is connected to the IP network came up at the last reboot of the LAN switch and there are no syslog messages indicating it ever went down. Furthermore, an active periodic SNMP poll (every 1 min for example) of LAN switch 515 also indicates that the state of the UPLINK port is also up and operational.

Additional information is also obtained from the other components of the network using the ports, routing protocols, subnets (e.g. 1.1.1.x) using simple network management protocol (SNMP) polls. For example, a SNMP poll of user device 510 shows that the phone is still registered with the VOIP Call Control Server 540. An SNMP poll from the IPS 525 indicates that a session (e.g., via SIP) between subnets 1.1.1.1 and 2.2.2.2 was allowed and not denied. An additional SNMP poll from the IPS indicates that a session between subnets 1.1.1.1 (VOIP Phone) and 3.3.3.3 (Media Gateway) was allowed. An SNMP poll (or an API request or even logs) from the firewall 530 indicates that there is an active TCP or UDP session established between subnets 1.1.1.1 (VOIP Phone) and 2.2.2.2 (call server). Another SNMP poll from firewall 530 indicates that there is an active TCP or UDP session established between 1.1.1.1 (VOIP Phone) and 3.3.3.3 (Media Gateway), establishing that there is media traffic (voice/video) between the VoIP Phone 510 and the Media Gateway 550. Furthermore, an active pull of live data from the Media Gateway 550 indicates that the A is participating in an active call. The sum of this data indicates to a high degree of certainty that the VOIP Phone A is actually in-service and that there appears to be a communication problem between the VOIP Phone 510 and the VOIP management system 505. The same or similar data can be analyzed to obtain characteristics regarding the communication issue, and thereby determine what the communication issue may be. Implementations consistent with the present disclosure can include messages composed with content that identify this set of information and the foregoing assessment for action by an automated system, a security analyst 280 or other administrator.

The systems and methods disclosed herein helps to identify VoIP end user devices that are out of service rapidly, predictively and without the need for manual human intervention or analysis. Data from various sources are used to train a machine learning algorithm which is able to assess baselines and patterns in the data. Based on the training, the machine learning algorithm can determine whether one or multiple end user devices are truly offline when reported by their native management systems. The system is dynamic and has a very high degree of accuracy.

The methods and processes described herein, and specifically the execution of the machine learning algorithm(s) are performed by one or more computing devices (e.g., user devices, physical servers, workstations, storage arrays, cloud computing resources, etc.) that communicate and interoperate over one or more networks to perform the described functions. Each such computing device typically includes a processor (or multiple processors) that executes program instructions stored in a memory or other non-transitory computer-readable storage medium or device (e.g., solid state storage devices, disk drives, etc.). Where the computer system includes multiple computing devices, these devices can be, but need not be, co-located. The results of the disclosed methods and tasks can be persistently stored by transforming physical storage devices, such as solid-state memory chips or magnetic disks, into a different state. In some embodiments, the computer system may be a cloud-based computing system whose processing resources are shared by multiple distinct business entities or other users.

The methods and algorithms described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium.

It is to be understood that any structural and functional details disclosed herein are not to be interpreted as limiting the systems and methods, but rather are provided as a representative embodiment and/or arrangement for teaching one skilled in the art one or more ways to implement the methods.

It is to be further understood that like numerals in the drawings represent like elements through the several figures, and that not all components or steps described and illustrated with reference to the figures are required for all embodiments or arrangements.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and "comprising", when used in this specification, specify the presence of stated features, integers, steps, operations, elements, or components, but do not preclude the presence or addition of one or more other features, integers, steps, operations, elements, components, or groups thereof.

Terms of orientation are used herein merely for purposes of convention and referencing and are not to be construed as limiting. However, it is recognized these terms could be used with reference to a viewer. Accordingly, no limitations are implied or to be inferred.

Also, the phraseology and terminology used herein is for the purpose of description and should not be regarded as limiting. The use of "including," "comprising," or "having," "containing," "involving." and variations thereof herein, is meant to encompass the items listed thereafter and equivalents thereof as well as additional items.

The subject matter described above is provided by way of illustration only and should not be construed as limiting. Various modifications and changes can be made to the subject matter described herein without following the example embodiments and applications illustrated and described, and without departing from the true spirit and scope of the invention encompassed by the present disclosure, which is defined by the set of recitations in the following claims and by structures and functions or steps which are equivalent to these recitations.

What is claimed is:

1. A method of determining whether an end user device coupled to a voice over Internet Protocol (VOIP) network is online or offline, comprising:
    assembling source data from a variety of network monitoring devices and services including at least one selected from the group consisting of: of asset inventories, VOIP Call Control Servers, routers, firewalls, and intrusion protection systems (IPSs) concerning an online and offline status of a plurality of end user device in the network;
    training a machine learning algorithm using the source data to determine whether the end user devices coupled to the VoIP network are online or offline; and
    after training, executing the machine learning algorithm to determine whether a specific end user device currently coupled to the VoIP network is online or offline.

2. The method of claim 1, further comprising vectorizing the assembled source data into a format suited for input to the machine learning algorithm.

3. The method of claim 1, wherein the source data is assembled from all of the group consisting of: asset inventories, VOIP Call Control Servers, routers, firewalls, and intrusion protection systems (IPSs).

4. The method of claim 1, wherein the source data includes an IP address, a MAC address, a phone number, a network status and a hardware model of the end user device.

5. The method of claim 4, wherein the source data further includes a Session Initiation Protocol (SIP) registration state and SIP registration time, as well as a local area network (LAN) hostname and LAN switch port.

6. A method of diagnosing a potential outage in a voice over Internet Protocol (VOIP) network, comprising:
    assembling source data from a variety of network monitoring devices and services including at least one selected from the group consisting of: of asset inventories, VOIP Call Control Servers, routers, firewalls, and intrusion protection systems (IPSs) concerning an online and offline status of a plurality of end user devices in the network;
    training a first machine learning algorithm using the source data to determine whether the end user devices coupled to the VoIP network are online or offline;

training a second machine learning algorithm using the source data to diagnose outages in the VoIP network based on patterns of online or offline end user devices in the VoIP network;

monitoring a plurality of end user device currently coupled to the VoIP network;

detecting a potential outage among the end user devices in the VoIP network;

executing the first trained machine learning algorithm to determine whether end user devices perceived to be offline are likely actually offline due to an outage; and executing the second machine learning algorithm to determine diagnostic features of the outage, when end users devices are determined to be actually offline, including whether the outage is confined to one or more of a specific location, a building, a geographic area, or a subnet.

7. The method of claim 6, wherein diagnostic features of the outage include information regarding whether the outage is confined to one or more of the specific location, the building, the geographic area, or the subnet.

8. The method of claim 7, wherein diagnostic features of the outage further include a determination of the location in the VoIP network that is a source of power-failure issue or malfunction.

9. The method of claim 6, further comprising vectorizing the assembled source data into a format suited for input to the first and second machine learning algorithms.

10. The method of claim 6, wherein the source data is assembled from all of the group consisting of: asset inventories, VOIP Call Control Servers, routers, firewalls, and intrusion protection systems (IPSs).

11. The method of claim 6, wherein the source data includes an IP address, a MAC address, a phone number, a network status and a hardware model of the end user device.

12. The method of claim 11, wherein the source data further includes a Session Initiation Protocol (SIP) registration state and SIP registration time, as well as a local area network (LAN) hostname and LAN switch port.

* * * * *